(12) United States Patent
Fu et al.

(10) Patent No.: US 8,132,054 B2
(45) Date of Patent: Mar. 6, 2012

(54) SELF-ADAPTIVE SOLUTION FOR DETERMINING THE WAITING TIME ON PAGE LOADING

(75) Inventors: Xiao Jing Fu, Beijing (CN); Xue Chao Li, Beijing (CN); Shou Hui Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 12/466,556

(22) Filed: May 15, 2009

(65) Prior Publication Data

US 2010/0131798 A1    May 27, 2010

(30) Foreign Application Priority Data

May 30, 2008   (CN) .......................... 2008 1 0108423

(51) Int. Cl.
*G06F 11/00* (2006.01)

(52) U.S. Cl. ............................. 714/33; 714/25; 714/47.1

(58) Field of Classification Search .................... 714/25, 714/33, 38, 39, 46, 47, 48, 38.1, 38.12, 43, 714/47.1, 47.2, 47.3; 709/219
See application file for complete search history.

(56) References Cited

U.S. PATENT DOCUMENTS

| | | | |
|---|---|---|---|
| 6,249,886 B1 * | 6/2001 | Kalkunte | 714/47 |
| 7,200,804 B1 * | 4/2007 | Khavari et al. | 715/230 |
| 7,444,548 B2 * | 10/2008 | Shane | 714/38 |
| 7,757,175 B2 * | 7/2010 | Miller | 714/38 |
| 2001/0052003 A1 * | 12/2001 | Seki et al. | 709/219 |
| 2005/0229161 A1 * | 10/2005 | Wang et al. | 717/125 |
| 2007/0233454 A1 * | 10/2007 | Ito et al. | 703/26 |
| 2009/0040927 A1 * | 2/2009 | Tsun | 370/232 |
| 2009/0240805 A1 * | 9/2009 | Drees et al. | 709/224 |

* cited by examiner

*Primary Examiner* — Robert Beausoliel, Jr.
*Assistant Examiner* — Joseph D Manoskey
(74) *Attorney, Agent, or Firm* — Jerry W. Herndon (57) ABSTRACT

The present invention relates to page automation testing method and apparatus. According to one aspect of the invention, there is provided a method for automatically testing a page, comprising: determining based on a predetermined policy a setting value of wait time regarding whether the page is opened successfully; and conducting the page testing based on the setting value of wait time as determined.

23 Claims, 5 Drawing Sheets

SELF-ADAPTIVE SOLUTION FOR DETERMINING THE WAITING TIME ON PAGE LOADING

FIELD OF THE INVENTION

The present application generally relates to automation testing, and more particularly, to method and apparatus for adaptively setting the wait times for loading test pages.

BACKGROUND

To enhance the efficiency of testing, many tools, such as IBM Rational Functional Tester and HP WinRunner, have been developed for automation testing.

Figure 1:
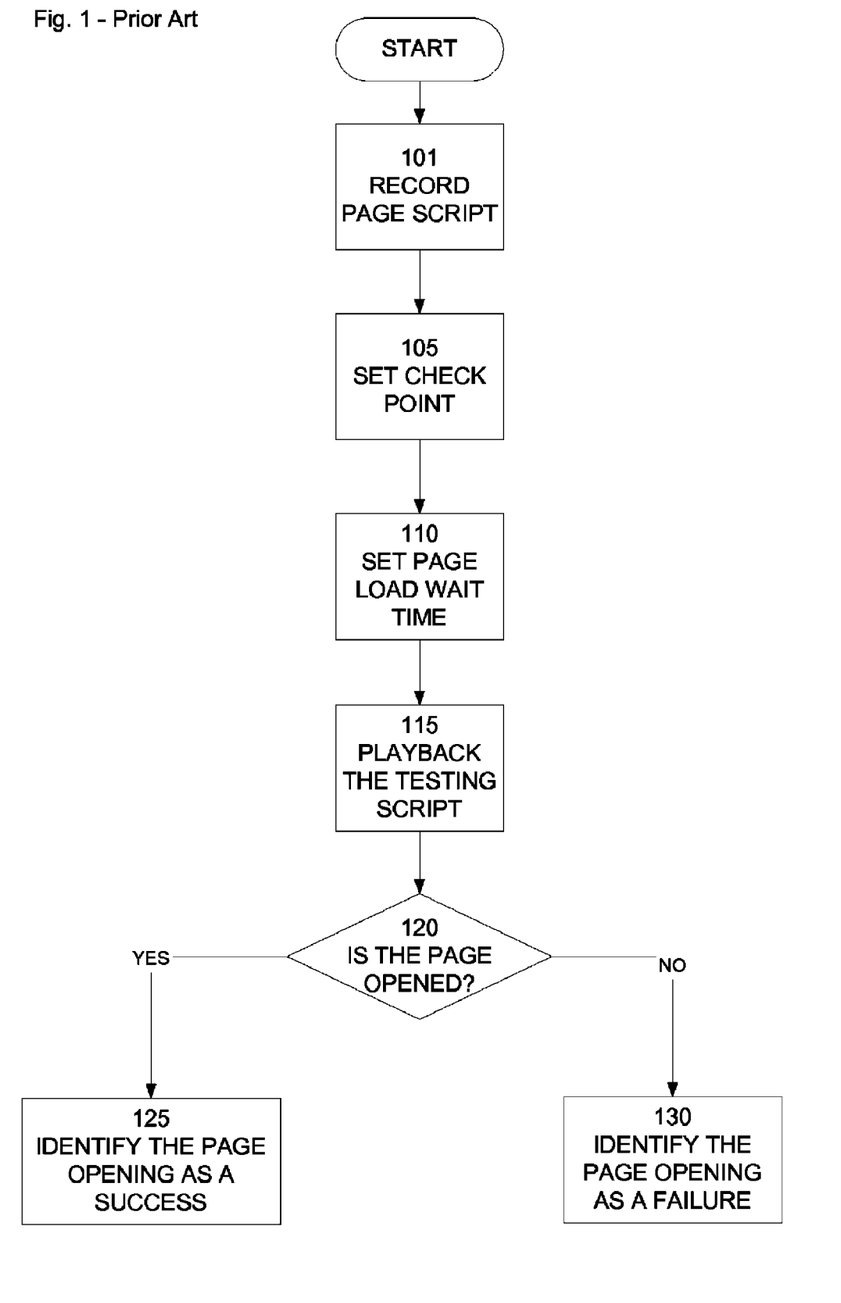
FIG. 1 shows a flowchart for carrying out the page testing with a conventional automation testing tool.

FIG. 1 shows a typical flowchart for the process of executing page testing with automation testing tools.

When automation testing is executed with automation testing tools, a series of actions are conducted by the tester under the record mode of the automation testing tool. During such process, the automation testing tool will automatically record testing scripts according to an action conducted by the tester (Step 101) and set a check point (Step 105). The use of a check point is to determine whether a page is successfully loaded or not upon testing this page. It is possible to make such determination by checking a property of HTML predetermined for the page, wherein a conventional property is wait time on loading of a page. Prior to playback of the test scripts, such automation testing tools need to set a wait time value for loading the page (Step 110). When starting to playback the test scripts (Step 115), the wait time functions as a comparing reference: If the page is opened within the wait time (Yes at Step 120), the testing result of this page is identified as successful (Step 125); and if the page cannot be opened within the wait time interval, the testing result of the page is identified as a failure (Step 130).

The wait time for testing all pages is set to a fixed time range in conventional automation testing tools. After the test, if the tester finds some pages cannot be opened within the fixed time range, in the case that the tester thinks the fixed time range is too small or that perhaps the network is congested, etc.), then the tester may manually modify the setting value of the wait time until those pages are eventually opened or the testers assume that those pages are failed in automation result. On the other hand, if the tester thinks the fixed time range reflects the actual condition of the pages (for example, the fixed time range is large enough), or the purpose for the test is just to obtain an approximate result for reference, then the results of these pages may be directly marked as failure.

As mentioned above, in the conventional automation testing, since the wait time of each page to be tested is set to the same fixed value, the testing result will not reflect conditions due to a complicated environment, such as unstable network, different response time to different kinds of pages and middlewares, etc. Specifically, if the fixed wait time for a page is set to a small value, it will affect the accuracy of the testing result. For example, some normal pages which need a longer time range to be opened would be determined as failures because the wait time is set too small. In this case, it is inconvenient that after testing, the tester will frequently and manually adjust the value of the wait time of the pages that can be opened, but are not opened due to the small wait time. On the other hand, if such wait time is set to a larger value to ensure that no page will be missed due to the setting of the wait time, the whole testing process will take a long time and time will be wasted at the pages that cannot be opened at all, causing a lower efficiency of the test.

SUMMARY OF THE INVENTION

In view of above problems in the prior art, the present invention provides a method and apparatus for self-adaptively determining the setting of wait time during page testing.

To achieve the above object, according to one aspect of the invention, there is provided a method for automatically testing a page, comprising: determining based on a predetermined policy a setting value of wait time regarding whether the page can be opened successfully within the wait time; and conducting the page testing based on the setting value of wait time as determined.

Preferably, the method may further comprise, in the step of determining the setting value of wait time, determining the setting value of wait time for the page based on the comparison of actual load time for the page with corresponding historical values of wait time.

Preferably, the method may further comprise setting a lower threshold and an upper threshold used in the comparison.

Preferably, the method may further comprise, in the step of determining the setting value of wait time, if the ratio of the actual load time to the historical value of the wait time is less than the lower threshold, the setting value of wait time is decreased.

Preferably, the method may further comprise, in the step of determining the setting value of wait time, if the ratio of the actual load time to the historical value of the wait time is larger than the upper threshold, the setting value of wait time is increased.

Preferably, in the method of the invention, the historical value of the wait time is an average of a plurality of last setting values of wait time or the current setting value of the wait time.

Preferably, the method may further comprise determining whether the page is loaded successfully; counting the times for failing to load the page; and determining whether the number of failing times are beyond a limit. If the number of failing times is not beyond the limit, the setting value of wait time is increased for the page.

Preferably, the method may further comprise, in the step of determining the setting value of wait time, determining the setting values of wait time for a plurality of pages under test uniformly based on monitoring of actual load time for a selected sample page.

Preferably, the method may further comprise setting another lower threshold and upper threshold for determining the monitoring condition of the sample page.

Preferably, the method may further comprise, in the step of determining the setting value of wait time, if the ratio of the actual load time for the sample page to the historical value of wait time for the sample page is less than another lower threshold, the setting values of wait time for a plurality of pages under test are decreased uniformly.

Preferably, the method may further comprise, in the step of determining the setting value of wait time, if the ratio of the actual load time for the sample page to the historical value of wait time for the sample page is larger than said another upper threshold, the setting values of wait time for a plurality of pages under test are increased uniformly.

According to another aspect of the invention, there is provided a method for automatically testing a page, characterized in that determining a wait time is based on a predetermined policy regarding whether the page is opened successfully.

According to still another aspect of the invention, there is provided an apparatus for automatically testing a page, comprising: a determining unit for determining a setting value of wait time based on a predetermined policy regarding whether the page is opened successfully; and a testing unit for conducting a page test based on the wait time as determined by the determining unit.

Preferably, in the apparatus, the determining unit may further comprise: an acquiring unit for acquiring the actual load time for the page under test, a comparison unit for determining the setting value of wait time for the page based on the comparison of the actual load time acquired by the actual load time acquiring unit with a corresponding historical value of wait time.

Preferably, in the apparatus, the determining unit may further comprise: an initiating unit for initiating lower and upper thresholds that are used during the comparison performed by the comparison unit.

Preferably, the apparatus may further comprise a wait time setting modification unit. As a result of the comparison by the comparison unit, if the ratio of the actual load time to the historical value of wait time is less than the lower threshold, the wait time setting modification unit decreases the setting value of wait time; and if the ratio of the actual load time to the historical value of wait time is larger than the upper threshold, the wait time setting modification unit increases the setting value of wait time.

Preferably, in the apparatus, the determining unit may further comprise a page determining unit for determining whether a page is loaded successfully; a counter unit for counting the number of times for the pages that failed to be loaded and determining whether the number of failing times is beyond a limit, and the apparatus further comprises a wait time setting modification unit, which if the number of failing times is not beyond the limit, the wait time setting modification unit increases the wait time for the page.

Preferably, the apparatus may further comprise a sample page monitoring unit for determining the setting value of wait time based on a monitoring condition of the actual load time for the sample page. The sample page monitoring unit further comprises: a sample page selecting unit for selecting a sample page; a sample page actual load time acquiring unit for acquiring the actual load time for the selected sample page; and a sample page comparison unit for comparing the actual load time for the selected sample page with an historical value of wait time for the sample page.

Preferably, in the apparatus, the sample page monitoring unit may further comprise: a sample page threshold setting unit for setting another upper threshold and another lower threshold for identifying the monitoring condition of the sample page. And the apparatus further comprises: a wait time setting modification unit, as a result of the comparison from the sample page comparison unit, if the ratio of the actual load time for the sample page to the historical value of wait time for the sample page is less than another lower threshold, the wait time setting modification unit uniformly decreases the setting values of wait time for a plurality of pages under test; and for the result of the comparison from the sample page comparison unit, if the ratio of the actual load time for the sample page to the historical value of wait time for the sample page is larger than another upper threshold, the wait time setting modification unit uniformly increases the setting values of wait time for a plurality of pages under test.

In contrast to the prior art, the present invention provides a solution capable of adaptively determining the setting value of wait time so as to improve the efficiency and accuracy for automation test.

Those and other aspects and embodiments of the invention will be readily understood by the following detailed description in conjunction with the accompanying drawings. However, it should be noted that the present invention is fully described in the following description and other aspects, but the present invention should not be read restrictively. Many modification and changes can be made within the scope of the invention, and the invention intends to cover all of the modification and changes.

DETAILED DESCRIPTION

The preferred embodiments are explained with reference to the accompanying drawings.

First Embodiment

In the present invention, the term "wait time" refers to a wait period to be set for a page, which is used to determine whether the page can be opened during the test, and after wait for such period, a result whether the page can be opened can be obtained.

Figure 2:
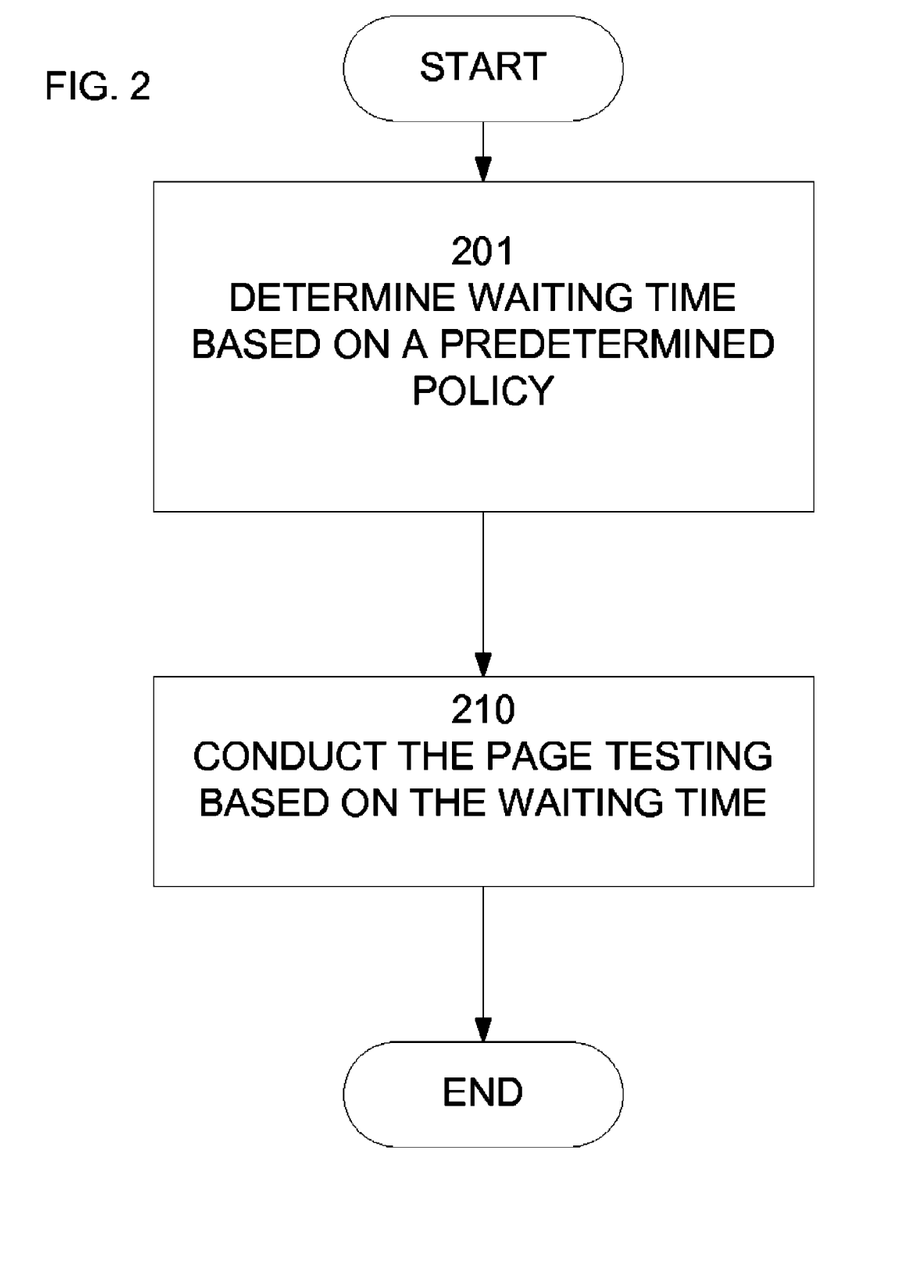
FIG. 2 shows a flowchart of a page automation testing method according to an embodiment of the present invention.

FIG. 2 shows a flowchart of a page automation testing method according to the present embodiment of the present invention.

A wait time settings list is maintained in computer memory in which page identifiers and corresponding wait time setting values are stored. At the beginning of the testing, each of the pages under test has an initial setting value of the wait time. This value might be the same for each page, or different for each page, or each of the pages may have adjusted (modified) setting values from prior testing runs. Alternatively, at step 201, an initial setting value of wait time for successfully opening a page can be determined based on a predetermined policy. For example, the predetermined policy can be set by taking into consideration the testing conditions (e.g., actual load time) and/or testing environment (e.g., some changes of platform software, such as network condition, different times of use, middlewares in use, database conditions and so on), and the wait time setting value can be adaptively adjusted based on the predetermined policy. Then, at step 210, the page testing is conducted based on the setting value of wait times determined accordingly.

According to the present embodiment, the setting value of wait time can be self-adaptively determined so as to improve the efficiency and accuracy of the automation test.

Second Embodiment

Figure 3:
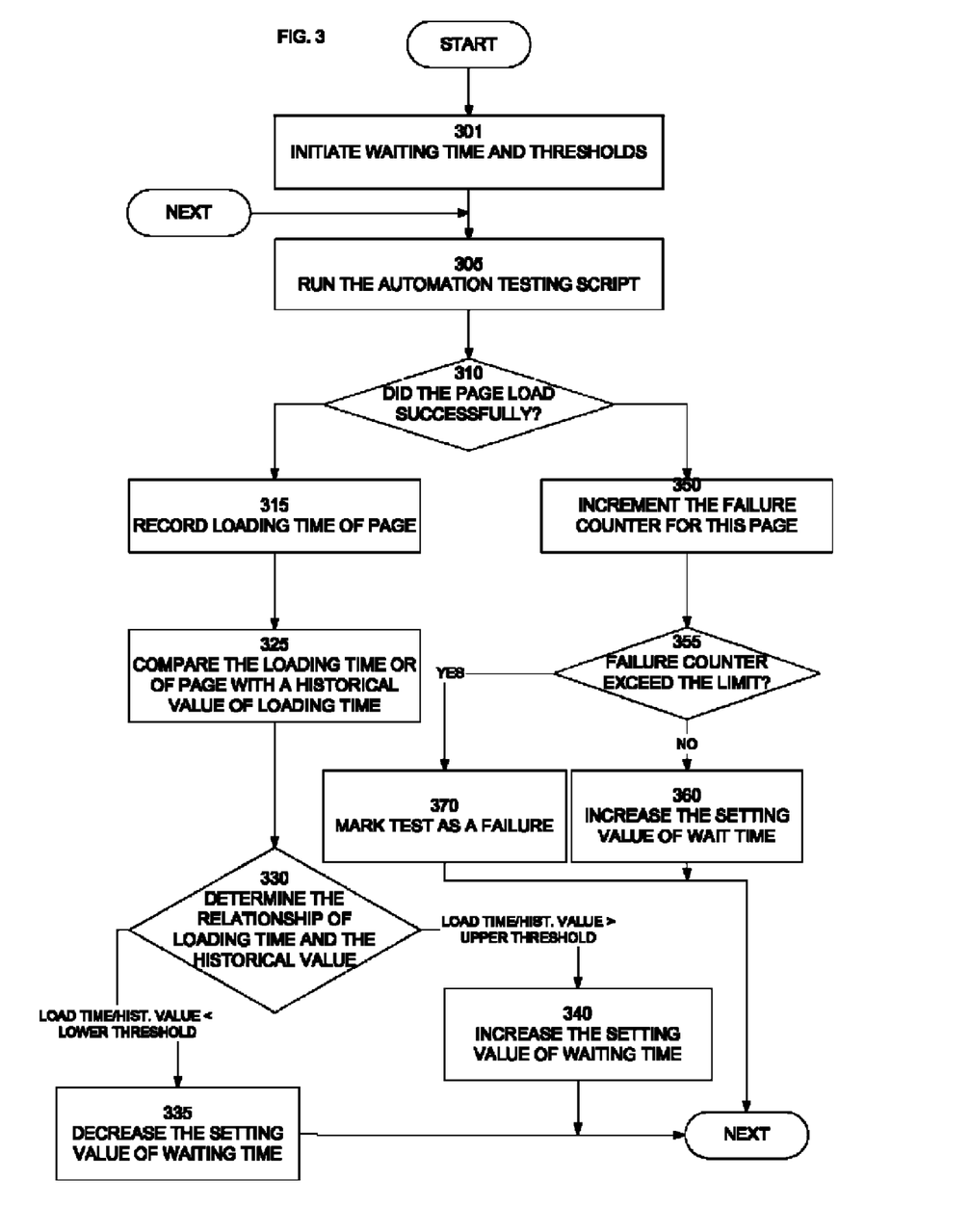
FIG. 3 shows a flowchart of a page automation testing method according to another embodiment of the present invention.

FIG. 3 shows a flowchart of a page automation testing method according to the present embodiment of the present invention.

Firstly, at step 301, the setting value of the wait time is initiated. As disclosed above, the initial setting value of the wait time may be fixed for each page. A list can be used to store the setting value of the wait time for each page. A threshold value can be set so as to evaluate whether the setting value of the wait time is appropriate for current page. For example, an upper threshold value and a lower threshold value can be set. Those skilled in the art will appreciated that there is no limitation placed to the threshold value in the invention, and different values can be set in view of different pages, different testing environments and different testing times as long as the evaluation condition can be substantially reflected. As an example, the upper threshold value can be set to 80% and the lower threshold value can be set to 20%.

Next, an automation testing scripts is running at step 305 to conduct page test.

Next, a determination as to whether the page is successfully loaded is made at step 310. Those skilled in the art will understand that the determination can be made by setting a check point and checking a property value predetermined for the page, as described with reference to FIG. 1.

When the page is successfully loaded at step 310, the testing process of the invention proceeds to step 315. At step 315, the actual page load time, i.e., the time for practically load the page, is recorded.

Next, at Step 325, the actual page load time is compared with a corresponding history of the setting value of wait time. For example, a historical value of the wait time may be either an average of a plurality of last setting values of wait time for the page to be tested or the setting value of the wait time from a previous run.

At step 330, a determination is made with respect to the relationship of the actual page load time and a historical value of the wait time. For example, the ratio of the actual page load time to a historical value of the wait time is compared with the upper threshold and lower threshold, respectively. When the ratio of the actual page load time to the historical value of the wait time is smaller than the lower threshold, it is determined that the historical value of the wait time is too large for the current page, that is, some time is wasted. Then the process proceeds to step 335. At step 335, the current wait time is decreased. For example, the historical value of the wait time can be multiplied by a certain weight to obtain the decreased setting value of wait time as the one for the next test. As an illustrative example, the weight can be set to 60%, for example.

On the other hand, when the ratio of the actual page load time to the historical value of the wait time is larger than the upper threshold, it is determined that the historical value of the wait time is too small for the current page. That is, there is a possibility to erroneously determine that the current page fails to be opened. Then the process proceeds to step 340. At step 340, the setting value of the wait time is increased. Similarly, the historical value of the wait time can be multiplied by a certain weight to obtain the increased setting value of wait time as the one for the next test. As an illustrative example, the weight can be set to 120%, for example.

When the determination of failing to load the page is made at step 310, the testing process of the invention proceeds to step 350. At step 350, a failure counter is incremented to count the times of load failure of the page.

Next, at step 355, it is determined whether the number of times of load failure goes beyond a limit. The limit herein is not restricted, but for the purpose of improving the efficiency of the testing, the limit can be set to a smaller value, for example, 2-3 times.

When the times of failure do not go beyond the limit value at step 355, the testing process of the invention proceeds to step 360. At step 360, the setting value of wait time for the page is increased. Similarly, the historical value of the wait time can be multiplied by a certain weight to obtain the increased setting value of wait time, for example, the setting value of wait time can be doubled.

On the other hand, as a result of determination at step 335, if the times of failure are beyond the limit, the testing process of the invention proceeds to step 370. At step 370, the page testing is identified as a test failure.

The testing process of the invention is described above with reference to FIG. 3. According to the present embodiment, the setting value of wait time for a page is determined by comparing the actual page load time with a historical value of the corresponding wait time. Specifically, if the ratio of the actual page load time to the historical value of the wait time is smaller than the lower threshold, the setting value of wait time is decreased; and if the ratio of the actual page load time to the historical value of the wait time is larger than the upper threshold, the setting value of wait time is increased. Therefore, a suitable setting value of wait time can be automatically determined based on the actual condition of page testing, such that the accuracy and efficiency of automation testing can be improved.

According to the testing method of the invention, a setting value of wait time can be self-adaptively determined for each page. However, the present application is not restricted to this. For example, the above process can be applied from a part of page selected from the pages to be tested so self-adaptively determine the suitable setting value of wait time for this part of pages. In such condition, the accuracy and efficiency of automation testing can be improved to some extend.

Third Embodiment

Figure 4:
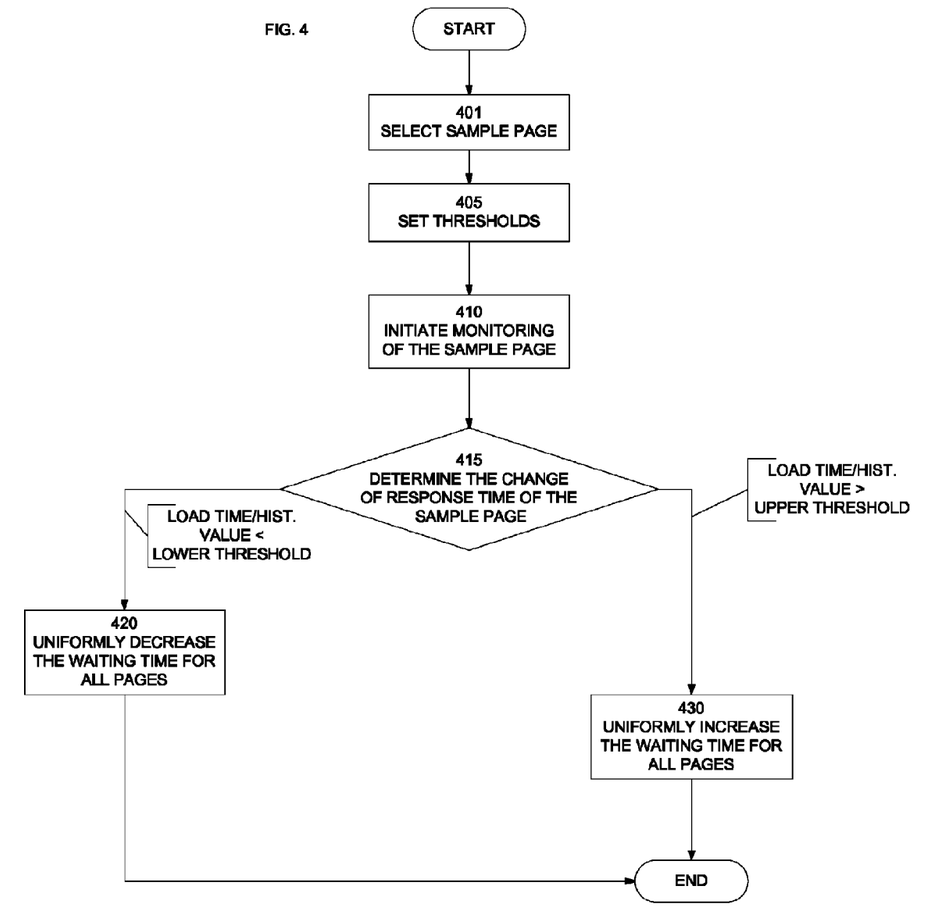
FIG. 4 shows a flowchart of a page automation testing method according to yet another embodiment of the present invention.

FIG. 4 shows a flowchart of a page automation testing method according to an embodiment of the present invention.

As shown in FIG. 4, at step 401, a sample page is selected. The term "sample page" herein refers to a representative page selected from the ones to be tested. The selection of the sample page is related to element(s) interested in the testing. One relative page, with some elements interested in the testing, can be selected as a sample page. Illustratively, if the tester is interested in the element(s) on a database (under assumption that the database has just been developed or updated), then a page with element(s) related to the database can be selected as the sample page. Those skilled in the art will understand that the sample page can be adjusted according to the changes of testing environment.

Next, at step 405, a threshold is set for monitoring the sample page. For example, an upper threshold and a lower threshold can be set. Those skilled in the art will understand that those thresholds should be suitable for the sample page selected and be variable. As an example, the upper threshold value can be set to 80% and the lower threshold value can be set to 20%.

Next, at step 410, monitoring the sample page is initiated. Such monitoring is for determining the change of actual time on loading the sample page so as to reflect any change in the testing environment.

At step 415, a determination is made in any change of the response time of the sample page. Specifically, the actual time of loading the sample page is compared with the corresponding setting value of wait time, for example. In the present application, the historical value of wait time of loading the sample page can be used in the comparison, for example, an average of a plurality of last setting values of wait time of loading the sample page or the current setting value of its wait time.

When the ratio of the actual time of loading the sample page to the historical value of the wait time is smaller than the lower threshold, it is determined that an abrupt change may have occurred in the testing environment (for example, reduced network load) and the historical value of the wait time is too large for the current testing environment. In this event, the process proceeds to step 420, where the setting values of the stored wait times for a plurality of test pages are uniformly decreased. As an example, the historical values of the wait time for a plurality of test pages can be multiplied by a certain weight to obtain the decreased setting values of wait time. As an illustrative example, the weight can be set to 60%.

On the other hand, when the ratio of the actual load time of the sample page to the historical value of the wait time is larger than the upper threshold, it is determined that an abrupt change may have occurred in the testing environment (for example, increased network load) and the historical value of the wait time is too small for the current testing environment. In this event, the process proceeds to step 430. At step 430, the setting values of wait time for a plurality of testing pages are uniformly increased. Similarly, the historical values of the wait time for a plurality of test pages can be multiplied by a certain weight to obtain the increased setting values of wait time. As an illustrative example, the weight can be set to increase by 60%.

According to the present embodiment, the setting values of wait time for a plurality of testing pages are updated uniformly based on monitored result of the sample page. Specifically, if the ratio of the actual time of loading the sample page to the historical value of the wait time is smaller than the lower threshold, the setting values of wait time for a plurality of test pages are decreased; and if the ratio of the actual time of loading the sample page to the historical value of the wait time is larger than the upper threshold, the setting values of wait time for a plurality of testing pages are increased. Therefore, the setting values of wait time for a plurality of test pages can be uniformly determined based on a monitored result of the sample page, such that the accuracy and efficiency of automation testing can be improved.

The process of the invention may be conducted every predetermined period, for example, every several hours.

Furthermore, while the setting values of wait time for all pages to be tested are uniformly adjusted based on the monitoring of the sample page, it is also possible to select from all the test pages the pages having the same interested element(s) as that of the sample page, and uniformly adjusting the setting value of wait time only for these pages.

Those skilled in the art will understand that the approach in this embodiment can be applied separately, or can be applied by combining with the approach described in the second embodiment. In the case of combination, it is possible to avoid conflict of these two approaches by setting different timings, that is, to avoid the case that the two approaches modify the setting value of wait time at same time, although the case seldom occurs. For example, if the setting value of wait time for the current page is modified by the approach described in the second embodiment, a lock identifier is set. The approach in the present embodiment is suspended when detecting the lock identifier. The combination of the second and third embodiments makes it possible to self-adaptively determine the setting value of wait time and to instantly update the setting value of wait time for all of the interested pages. Therefore, the efficiency and accuracy can be further improved.

Those skilled in the art will appreciate that the second and third embodiments of the invention are illustrative, and that other comparison manner can be used in the present invention as long as the adaptive condition with respect to the actual load time and the historical value of the wait time or the change of current testing environment can be reflected by such comparison manner. For example, the difference between the actual time of loading a page and the historical value of wait time may be calculated and the ratio of the absolute value of the difference to the historical value of wait time is subsequently calculated. If the ratio is larger than a first threshold (e.g., 80%), then the setting value of wait time is decreased; and if the ratio is less than a second threshold (e.g., 20%), the setting value of wait time is increased for the page.

Fourth Embodiment

Figure 5:
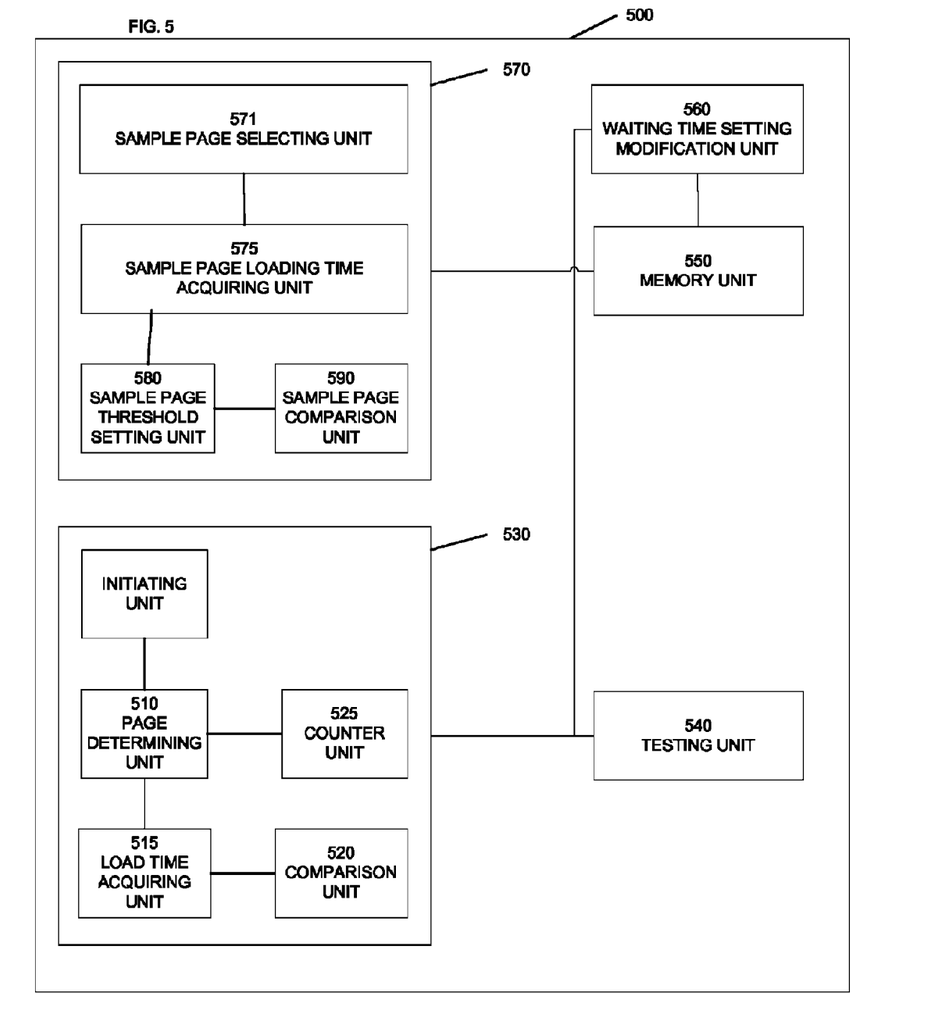
FIG. 5 shows a block diagram of automation testing apparatus according to still another embodiment of the present invention.

FIG. 5 shows a block diagram of a page automation testing apparatus according to an embodiment of the present invention.

As shown in FIG. 5, a page automation testing apparatus 500 comprises: a determining unit 530 for determining, based on a predetermined policy, a setting value of wait time as to whether the page is successfully opened; and a testing unit 540 for conducting a page test based on the wait time determined by the determining unit 530.

The determining unit 530 comprises: an initiating unit 501 for initiating the setting value of wait time for the page; a page determining unit 510 for determining whether the page is loaded successfully; a actual load time acquiring unit 515 for acquiring the actual load time for the page under test in the case that the determining unit 530 determines that the page is opened successfully; and a comparison unit 520 for determining the setting value of wait time for the page based on the comparison of the actual load time acquired by the actual load time acquiring unit 515 with a corresponding historical value of wait time.

The initiating unit 501 also initiates or sets thresholds which are used for evaluating whether the setting value of wait time is suitable for the page under test. For example, it is possible to set an upper threshold and a lower threshold used by the comparison unit 520 for the test.

In the present invention, the historical value of wait time for a page can be used during comparison. As an example, the historical value of wait time can be an average of a plurality of last setting values of wait time for the page under test or the current setting value of wait time.

The page automation testing apparatus 500 further comprises a wait time setting modification unit 560. As a result of the comparison from comparison unit 520, if the ratio of the actual load time to the historical value of wait time is less than the lower threshold, it is determined that the historical value of wait time is too large for the current page, i.e., time is wasted. Thus the wait time setting modification unit 560 decreases the setting value of wait time. For example, the historical value of the wait time can be multiplied by a certain weight to obtain a decreased setting value of wait time. As an illustrative example, the current value can be multiplied by 60%, for example.

On the other hand, as a result of the comparison from comparison unit 520, if the ratio of the actual load time for the pages to the historical value of wait time is larger than the upper threshold, it is determined that the historical value of wait time is too small for the current page, i.e., there is a possibility to erroneously determine the current page as failing to be opened. Thus the wait time setting modification unit 560 increases the setting value of wait time. Similarly, the historical value of the wait time can be multiplied by a certain weight to obtain an increased setting value of wait time. As an illustrative example, the multiplication weight can be set to 120%.

The determining unit 530 further comprises a counter unit 525 for counting the number times a page failed to load and determining whether the failing number is beyond a limit. If the failing number is not beyond the limit, the wait time setting modification unit 560 increases the setting value of wait time for the page. If the failing number is beyond the limit, the wait time setting modification unit 560 identifies the result of testing as a test failure, rather than a load failure.

Optionally, the page automation testing apparatus 500 may further comprise a sample page selecting unit 571 for selecting a sample page based on interested elements; a sample page actual load time acquiring unit 575 for acquiring the actual load time for the selected sample page; a sample page threshold setting unit 580 for setting an upper threshold and a lower threshold for identifying the monitoring condition of the sample page; and a sample page comparison unit 590 for comparing the actual load time for the selected sample page with the historical value of wait time for the sample page.

As a result of the comparison from the sample page comparison unit 590, if the ratio of the actual load time for the sample page to the historical value of wait time for the sample page is less than another lower threshold, the wait time setting modification unit 560 uniformly decreases the setting values of wait time for a plurality of pages under test. On the other hand, if the ratio of the actual load time for the sample page to the historical value of wait time for the sample page is larger than another upper threshold, the wait time setting modification unit 560 uniformly increases the setting values of wait time for a plurality of pages under test.

In addition, the page automation testing apparatus 500 according to the present application may further comprise a memory unit 550 for storing the setting values of page wait time, page load time, page thresholds and the like.

Those skilled in the art will appreciate that the present invention can be implemented as a single testing tool or as a plug-in or module combined with the testing tool.

The description of embodiments fully shows the common aspects of the invention; other aspects of the invention can be readily modified and/or applied to the embodiments by combining disclosed and present knowledge without going beyond the normal principle. Therefore, such modifications should and are intended to be within the concept and scope of the invention. While the invention is described according to the preferred embodiments, those skilled in the art will appreciate that the invention can be achieved by making changes within the scope of accompanying claims.

What is claimed is:

1. A method for adaptively testing a page, comprising:
   determining based on a predetermined policy a value of wait time regarding whether the page can be loaded successfully within the wait time;
   conducting the page testing based on the initial value of wait time as determined; and adjusting the value of the wait time down in response to a determination that the page successfully loaded and adjusting the wait time up in response to a determination that the page failed to load within the wait time.

2. The method according to claim 1, wherein the step of adjusting the value of wait time is based on the comparison of actual load time for the page with a corresponding historical value of wait time for the page.

3. The method according to claim 2, further comprising:
   setting a lower threshold of wait time and an upper threshold of wait time used in the comparison.

4. The method according to claim 3, wherein, in the step of adjusting the value of wait time, if the ratio of the actual load time to the historical value of the wait time is less than the lower threshold, the value of wait time is decreased.

5. The method according to claim 3, wherein, in the step of adjusting the value of wait time, if the ratio of the actual load time to the historical value of the wait time is larger than the upper threshold, the value of wait time is increased.

6. The method according to claim 2, wherein the historical value of the wait time is an average of a plurality of last values of the wait time.

7. The method according to claim 2, wherein the historical value of the wait time is an average of a plurality of last values of the wait time.

8. The method according to claim 1, further comprising:
   determining whether the page is loaded successfully;
   counting the times for failing to load the page; and
   determining whether the failing times are beyond a limit, wherein, if the failing times are not beyond the limit, increasing the value of wait time for the page.

9. The method according to claim 1, wherein adjusting the value of wait time further comprises uniformly adjusting the values of wait time for a plurality of pages under test based on monitoring of actual load time for a selected sample page.

10. The method according to claim 9, further comprising:
    setting a lower threshold and an upper threshold for determining the value of wait time by monitoring the actual load time for the selected sample page.

11. The method according to claim 10, wherein, in the step of adjusting the value of wait time, if the ratio of the actual load time for the sample page to the historical value of wait time for the sample page is less than the lower threshold, decreasing the values of wait time for the plurality of pages.

12. The method according to claim 10, wherein, in the step of adjusting the value of wait time, if the ratio of the actual load time for the sample page to the historical value of wait time for the sample page is larger than the upper threshold, increasing the values of wait time for the plurality of pages under test.

13. An apparatus for automatically testing a page, comprising:
    a processor having the following units:
    a determining unit for determining based on a predetermined policy a value of wait time regarding whether the page is opened successfully; and
    a testing unit for conducting a page test based on the wait time as determined by the determining unit; and
    a wait time modification unit for adjusting the value of the wait time down if the page successfully loaded and adjusting the value of the wait time up if the page failed to load within the wait time.

14. The apparatus according to claim 13, wherein the determining unit further comprises:
    an acquiring unit for acquiring the actual load time for the page under test, and
    a comparison unit for determining the value of wait time for the page based on the comparison of the actual load time acquired by the acquiring unit with a corresponding historical value of wait time.

15. The apparatus according to claim 14, wherein the determining unit further comprises:
a initiating unit for initiating lower and upper thresholds that are used during the comparison performed by the comparison unit.

16. The apparatus according to claim 15, wherein the wait time modification unit further comprises:
a unit for decreasing the value of the wait time if, as a result of the comparison from the comparison unit, the ratio of the actual load time to the historical value of the wait time is less than the lower threshold, and for increasing the value of the wait time if as a result of the comparison from the comparison unit, the ratio of the actual load time to the historical value of the wait time is larger than the upper threshold.

17. The apparatus according to claim 14, the determining unit further comprising:
a page determining unit for determining whether the page is loaded successfully;
a counter unit for counting the number of times that a page failed to be loaded and determining whether the number of failing times is beyond a limit, and
the apparatus further comprises:
a wait time modification unit for increasing the wait time for the page, if the number of failing times is not beyond the limit.

18. The apparatus according to claim 14, further comprising:
a sample page monitoring unit for determining the value of wait time based on monitoring a condition of actual load time for a sample page,
the sample page monitoring unit further comprising:
a sample page selecting unit for selecting a sample page;
an acquiring unit for acquiring the actual load time of the selected sample page; and
a comparison unit for comparing the actual load time for the selected sample page with the historical value of wait time for the sample page.

19. The apparatus according to claim 13, wherein the historical value of the wait time is an average of a plurality of last values of the wait time.

20. The apparatus according to claim 18, the sample page monitoring unit further comprising:
a sample page threshold setting unit for setting an upper threshold and a lower threshold; and
the apparatus further comprises:
a wait time modification unit for decreasing the values of wait time for a plurality of pages if as a result of the comparison by the sample page comparison unit the ratio of the actual load time for the sample page to the historical value of wait time for the sample page is less than the lower threshold, and for increasing the values of wait time for a plurality of pages if the ratio of the actual load time of the sample page to the historical value of wait time for the sample page is larger than the upper threshold.

21. The apparatus according to claim 13, wherein the historical value of the wait time is the current value of the wait time.

22. A non-transitory computer-readable storage medium storing computer code for automatically testing a page, comprising:
code for determining based on a predetermined policy a value of wait time regarding whether the page can be loaded successfully within the wait time;
code for conducting the page testing based on the value of wait time as determined; wherein, the code for determining the value of wait time further comprises code for adjusting the value of wait time for the page based on the comparison of actual load time for the page with a corresponding historical value of wait time for the page.

23. A non-transitory computer-readable storage medium storing computer code for automatically testing a page, comprising:
code for determining based on a predetermined policy a value of wait time regarding whether the page can be loaded successfully within the wait time;
code for conducting the page testing based on the initial value of wait time as determined; and code for adjusting the value of the wait time down if the page successfully loaded and adjusting the value of wait time up if the page failed to load within the wait time.

* * * * *